(12) United States Patent
Byun

(10) Patent No.: US 11,512,789 B2
(45) Date of Patent: Nov. 29, 2022

(54) CHECK VALVE AND MODULATOR BLOCK INCLUDING SAME

(71) Applicant: MANDO CORPORATION, Pyeongtaek-si (KR)

(72) Inventor: Seung Hwan Byun, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/296,198

(22) PCT Filed: Nov. 22, 2019

(86) PCT No.: PCT/KR2019/016183
§ 371 (c)(1),
(2) Date: May 21, 2021

(87) PCT Pub. No.: WO2020/106113
PCT Pub. Date: May 28, 2020

(65) Prior Publication Data
US 2022/0010886 A1   Jan. 13, 2022

(30) Foreign Application Priority Data
Nov. 22, 2018   (KR) .................. 10-2018-0145501

(51) Int. Cl.
*F16K 27/02*   (2006.01)
*F16K 15/04*   (2006.01)
(Continued)

(52) U.S. Cl.
CPC ........ *F16K 27/0209* (2013.01); *F16K 15/042* (2013.01); *F16K 15/044* (2013.01);
(Continued)

(58) Field of Classification Search
CPC .. F16K 15/042; F16K 15/044; F16K 27/0209; B60T 15/02; B60T 17/00;
(Continued)

(56) References Cited

U.S. PATENT DOCUMENTS 3,581,762 A * 6/1971 Bracki .................. F16K 15/044
137/271
3,648,729 A * 3/1972 Balkany ................ F16K 15/044
137/533.15
(Continued)

FOREIGN PATENT DOCUMENTS

JP   2011-522687 A   8/2011
KR   10-2006-0082454 A   7/2006
(Continued)

OTHER PUBLICATIONS

International Search Report dated Mar. 23, 2020 for corresponding International Patent Application No. PCT/KR2019/016183.
(Continued)

*Primary Examiner* — Craig M Schneider
*Assistant Examiner* — Frederick D Soski
(74) *Attorney, Agent, or Firm* — Hauptman Ham, LLP

(57) ABSTRACT

Disclosed is a check valve and a modulator block including the same. An embodiment of the present disclosure provides a check valve comprising a valve housing including first and second internal flow passages each formed to pass through an interior of the valve housing and having an inlet through which a fluid is introduced and an outlet through which the fluid is discharged; a first opening and closing member provided in the first internal flow passage and opened and closed by a hydraulic pressure of the fluid; a second opening and closing member provided in the second internal flow
(Continued)

passage and opened and closed by the hydraulic pressure of the fluid; and a stopper member press-fitted to the valve housing.

17 Claims, 7 Drawing Sheets

(51) Int. Cl.
    *B60T 15/02*            (2006.01)
    *B60T 17/00*            (2006.01)

(52) U.S. Cl.
    CPC .............. *B60T 15/02* (2013.01); *B60T 17/00* (2013.01); *Y10T 137/7836* (2015.04); *Y10T 137/7839* (2015.04); *Y10T 137/7927* (2015.04); *Y10T 137/87885* (2015.04)

(58) Field of Classification Search
    CPC ......... Y10T 137/7838; Y10T 137/7839; Y10T 137/7927; Y10T 137/87885
    See application file for complete search history.

(56) References Cited

U.S. PATENT DOCUMENTS

| | | | | |
|---|---|---|---|---|
| 3,716,070 A * | 2/1973 | Klimkiewicz | ........ | F16K 15/044 137/539.5 |
| 4,011,887 A * | 3/1977 | Raymond | ........... | F15B 13/0871 137/880 |
| 4,856,549 A * | 8/1989 | Ueno | ...................... | F16K 17/19 137/112 |
| 5,127,440 A * | 7/1992 | Maas | ................... | B60T 8/3675 137/884 |
| 5,353,834 A * | 10/1994 | Schmitt | ................. | F16K 15/044 137/539.5 |
| 5,636,975 A * | 6/1997 | Tiffany | ................. | F04B 53/109 417/454 |
| 5,823,071 A * | 10/1998 | Petrosky | ............... | F16H 59/105 137/884 |
| 5,836,354 A * | 11/1998 | Amano | ................... | B60T 8/368 303/119.2 |
| 5,937,896 A * | 8/1999 | Miyajima | ............. | F16K 15/044 137/533.13 |
| 6,116,273 A * | 9/2000 | Tarr | ................... | F02M 63/0054 123/446 |
| 6,116,282 A * | 9/2000 | Yamaji | ................. | F16K 27/003 137/884 |
| 6,581,632 B2 * | 6/2003 | Walpole | ................ | F16K 15/026 137/512.1 |
| 6,684,415 B1 * | 2/2004 | Kozono | ................ | E03C 1/1225 137/512 |
| 8,056,577 B2 * | 11/2011 | Street | ........................ | F17C 5/06 137/263 |
| 8,951,026 B2 * | 2/2015 | Mohamed | ........... | F04B 39/1013 137/512.1 |
| 2002/0020451 A1 * | 2/2002 | Reid, II | .............. | F15B 13/0892 137/884 |
| 2002/0043288 A1 * | 4/2002 | Seitz | .................... | F15B 13/0821 137/883 |
| 2003/0155025 A1 * | 8/2003 | Camozzi | ............. | F15B 13/0402 137/884 |
| 2003/0193187 A1 * | 10/2003 | Takada | ................. | F16L 37/144 285/120.1 |
| 2003/0196704 A1 * | 10/2003 | Nakazawa | ........... | B60T 8/4872 137/539 |
| 2004/0194834 A1 * | 10/2004 | Rehder | ................ | F16K 27/003 137/884 |
| 2005/0126638 A1 * | 6/2005 | Gilbert | ................. | F16K 15/044 137/539 |
| 2005/0145281 A1 * | 7/2005 | Chalich | ................. | F16K 15/042 137/526 |
| 2005/0274421 A1 * | 12/2005 | Abe | ...................... | F16K 27/003 137/606 |
| 2007/0186775 A1 * | 8/2007 | DiPrizio | ............ | B01D 46/0013 96/4 |
| 2008/0237514 A1 * | 10/2008 | Yonezawa | ........... | F15B 11/0445 137/516.11 |
| 2008/0257432 A1 | 10/2008 | Nissen et al. | | |
| 2008/0271796 A1 * | 11/2008 | Neumann | ................. | F17C 5/06 137/606 |
| 2009/0283543 A1 * | 11/2009 | Schroeder | ............... | F16L 39/00 222/144.5 |
| 2010/0116364 A1 * | 5/2010 | Koyama | ................. | F16K 47/10 137/535 |
| 2011/0036422 A1 * | 2/2011 | Hanley | ............... | F16K 27/0209 137/511 |
| 2011/0067773 A1 * | 3/2011 | Ambrose | ................ | G01M 3/28 137/861 |
| 2011/0076171 A1 * | 3/2011 | Park | .................... | F16K 27/0209 417/571 |
| 2011/0158836 A1 * | 6/2011 | Wood | .................. | F04B 53/1007 417/554 |
| 2012/0227840 A1 * | 9/2012 | Lee | ...................... | F16K 27/0209 137/543.19 |
| 2013/0014837 A1 | 1/2013 | Huynh | | |
| 2013/0199636 A1 * | 8/2013 | Doh | .................... | F16K 27/0209 137/539 |
| 2013/0319562 A1 * | 12/2013 | Weh | .................... | F15B 13/0803 137/884 |
| 2013/0333770 A1 * | 12/2013 | Maita | .................... | F02M 59/48 137/315.41 |
| 2014/0007955 A1 * | 1/2014 | Dziurda | ............. | F16K 27/0209 137/543.19 |
| 2014/0020772 A1 * | 1/2014 | Anderson | ........... | F16K 17/0406 137/505.11 |
| 2014/0196651 A1 * | 7/2014 | Nirenberg | ................ | B63J 4/002 114/183 R |
| 2015/0068491 A1 * | 3/2015 | Jensen | .................... | F16K 47/08 123/294 |
| 2015/0107712 A1 * | 4/2015 | Kobayashi | ............ | F16K 27/041 137/884 |
| 2015/0219234 A1 * | 8/2015 | Hobmeyr | ............ | F16K 27/0245 251/366 |
| 2015/0292647 A1 * | 10/2015 | Le Pellec | ............ | F15B 13/0814 137/606 |
| 2016/0107626 A1 * | 4/2016 | Jeon | ........................ | B60T 7/042 303/15 |
| 2017/0102085 A1 * | 4/2017 | Smith, III | ............... | E21B 34/04 |
| 2017/0146140 A1 * | 5/2017 | Jeon | ........................ | B60T 8/341 |
| 2017/0159834 A1 * | 6/2017 | Jeon | ........................ | B60T 8/341 |
| 2018/0195510 A1 * | 7/2018 | Neumair | ............. | F04B 53/1087 |
| 2018/0200750 A1 * | 7/2018 | Ramina | ................. | F16K 15/042 |
| 2018/0252324 A1 * | 9/2018 | Yang | ..................... | F16K 15/148 |
| 2018/0273281 A1 * | 9/2018 | Latimer | ............... | B65D 25/385 |
| 2018/0296175 A1 * | 10/2018 | Carmody | ............... | A61B 6/032 |
| 2019/0003557 A1 * | 1/2019 | Cobb | ...................... | A47G 23/03 |
| 2019/0049025 A1 * | 2/2019 | Jeon | ........................ | B60T 1/00 |
| 2019/0101222 A1 * | 4/2019 | Burris | ................... | F16K 15/044 |
| 2019/0120392 A1 * | 4/2019 | Lee | .......................... | B60T 8/341 |
| 2019/0242376 A1 * | 8/2019 | Misuno | ................. | B60T 8/4031 |

FOREIGN PATENT DOCUMENTS

KR     10-2013-0092045 A     8/2013
KR         10-1622146 B1     5/2016

OTHER PUBLICATIONS

Written Opinion dated Mar. 23, 2020 for corresponding International Patent Application No. PCT/KR2019/016183.

* cited by examiner

CHECK VALVE AND MODULATOR BLOCK INCLUDING SAME

CROSS-REFERENCE TO RELATED APPLICATION

The present application is a national stage filing under 35 U.S.C § 371 of PCT application number PCT/KR2019/016183 filed on Nov. 22, 2019 which is based upon and claims the benefit of priorities to Korean Patent Application No. 10-2018-0145501, filed on Nov. 22, 2018 in the Korean Intellectual Property Office, which is incorporated herein in their entireties by reference.

TECHNICAL FIELD

The present disclosure relates to a check valve and a modulator block including the same, and more particularly, to a check valve used in a vehicle brake system and a modulator block including the same.

BACKGROUND ART

Generally, check valves are used in various fields with a configuration allowing only one-way flow of oil. As an example, a check valve may be provided in a brake system that controls the flow of oil so as to control a hydraulic pressure of a wheel cylinder.

Korean Patent Publication No. 10-2013-009205 discloses a brake system. According to the disclosed document, the brake system includes a modulator block in which a plurality of flow passages are formed to have a hydraulic circuit therein. The modulator block is compactly equipped with a plurality of solenoid valves, accumulators, motors, and pumps for controlling the flow of oil, and is configured to control the flow of oil in one-way by installing the check valve in an appropriate place in the flow passage.

However, Further to installing check valves in appropriate places in the flow passage, two check valves should be installed respectively in order to control the flow of oil in one-way in three-way flow passages of branch type. In particular, in the case of having one suction passage and two discharge passages among the three-way flow passages, since two check valves must be installed to be respectively connected to each discharge channel, and a flow passage must be processed separately so that two suction flow passages are connected to each other, the flow passage structure becomes complicated.

Further, since each bore for installing the check valve in the modulator block has to be machined, the volume of the modular block increases, as well as the assembly process and cost increase accordingly.

Further, since the check valve requires a separate forced press-fitting process when installed on the modulator block, management becomes difficult because precise mounting is required to reduce defects caused by misassembly.

DISCLOSURE

Technical Problem

The check valve and the modulator block including the same according to an embodiment of the present disclosure may simplify the structure by integrating two check valves into one, and reduce the flow passage structure and assembly process of the modulator block to which the structure is applied.

Technical Solution

An aspect of the present disclosure provides a check valve comprising a valve housing including first and second internal flow passages each formed to pass through an interior of the valve housing and having an inlet through which a fluid is introduced and an outlet through which the fluid is discharged; a first opening and closing member provided in the first internal flow passage and opened and closed by a hydraulic pressure of the fluid; a second opening and closing member provided in the second internal flow passage and opened and closed by the hydraulic pressure of the fluid; and a stopper member press-fitted to the valve housing.

Further, the check valve may further include a filter member installed in the valve housing to filter foreign substances in the fluid flowing into each of the inlets.

Further, the first opening and closing member may include a first ball configured to open and close in contact with a first orifice provided in the first internal flow passage, and a first elastic member configured to elastically press the first ball toward the first orifice, and the second opening and closing member may include a second ball configured to open and close in contact with a second orifice provided in the second internal flow passage, and a second elastic member configured to elastically press the second ball toward the second orifice.

Further, on a side of the valve housing, a body in which a first outlet of the first internal passage and a second outlet of the second internal passage are formed may be provided, and on an upper end of the body, a first opening communicating with the first internal flow passage and a second opening communicating with the second internal flow passage may be provided, and the stopper member may be press-fitted to the first and second openings.

Further, on a lower end of the body, a first coupling portion protruding downward so as to form a first inlet of the first internal flow passage and a second coupling portion protruding downward so as to form a second inlet of the second internal passage may be provided.

Further, the stopper member may include a first support press-fitted into the first opening and having a first support groove recessed inwardly, and a second support press-fitted into the second opening and having a second support groove recessed inwardly.

Further, the first and second supports may be provided to be press-fitted into the first and second openings and partially exposed toward the first and second outlets.

Further, the valve housing may include a guide wall partitioned between the first and second internal flow passages and press-fitted with the stopper member.

Another aspect of the present disclosure provides a modulator block with a three-way flow passage with one suction passage and two discharge passages or two suction passages and one discharge passage, the modulator block comprising one coupling bore communicating with the three-way flow passage, wherein the coupling bore may include a check valve that is press-fitted so as to control one-way flow of a fluid, and the check valve comprising: a valve housing including first and second internal flow passages each formed to pass through an interior of the valve housing and having an inlet through which a fluid is introduced and an outlet through which the fluid is discharged; a first opening and closing member provided in the first internal flow passage and opened and closed by a hydraulic pressure of the fluid; a second opening and closing member provided in the second internal flow passage and opened and closed by the hydraulic pressure of the fluid; and a stopper member press-fitted to the valve housing.

Further, in response to the one suction passage being provided, the one suction passage may be provided to be connected to each inlet of the first and second internal flow passages formed in the check valve, and the two discharge passages may be provided to be respectively connected to each outlet of the first and second internal passages.

Further, in response to the two suction passages being provided, the two suction passages may be provided to be respectively connected to each inlet of the first and second internal passages formed in the check valve, and the one discharge passage may be provided to be connected to each outlet of the first and second internal passages.

Further, the stopper member may be press-fitted to close the coupling bore.

Further, the modulator block may further include a filter member installed in the valve housing to filter foreign substances in the fluid flowing into each of the inlets.

Further, the first opening and closing member may include a first ball configured to open and close in contact with a first orifice provided in the first internal flow passage, and a first elastic member configured to elastically press the first ball toward the first orifice, and the second opening and closing member may include a second ball configured to open and close in contact with a second orifice provided in the second internal flow passage, and a second elastic member configured to elastically press the second ball toward the second orifice.

Further, on a side of the valve housing, a body in which a first outlet of the first internal passage and a second outlet of the second internal passage are formed may be provided, and on an upper end of the body, a first opening communicating with the first internal flow passage and a second opening communicating with the second internal flow passage may be provided, and the stopper member may be press-fitted to the first and second openings.

Further, on a lower end of the body, a first coupling portion protruding downward so as to form a first inlet of the first internal flow passage and a second coupling portion protruding downward so as to form a second inlet of the second internal passage may be provided.

Further, the stopper member may include a first support press-fitted into the first opening and having a first support groove recessed inwardly, and a second support press-fitted into the second opening and having a second support groove recessed inwardly.

Further, the first and second supports may be provided to be press-fitted into the first and second openings and partially exposed toward the first and second outlets.

Further, the valve housing may include a guide wall partitioned between the first and second internal flow passages and press-fitted with the stopper member.

Advantageous Effects

A check valve and a modulator block including the same according to an embodiment of the present disclosure can reduce cost due to a reduction in the number of parts by integrating two check valves into one.

By installing one integrated check valve in the modulator block, a structure of the flow passage in the modulator block may be simplified, and the volume and assembly man-hours may be reduced.

Even if a three-way flow passage with one suction passage and two discharge passages or two suction passages and one discharge passage is provided in the modulator block, design freedom may be improved by controlling the flow of oil in one-way regardless of the structure of a flow passage through one integrated check valve.

DESCRIPTION OF DRAWINGS

The present disclosure will be described in detail by the drawings below, but since these drawings show preferred embodiments of the present disclosure, the technical idea of the present disclosure should not be construed to be limited only to the drawings.

MODE OF THE DISCLOSURE

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
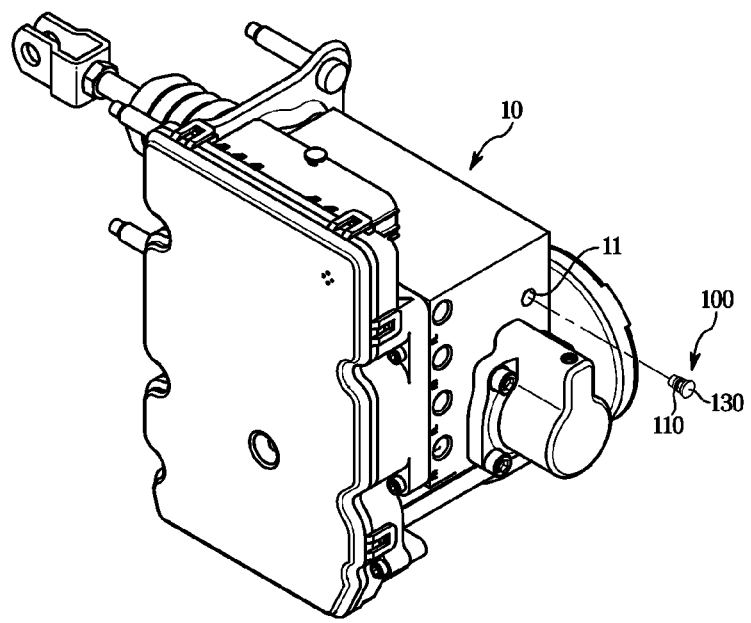
FIG. 1 is a view illustrating as an example a modulator block of a brake system to which a check valve is applied according to an embodiment of the present disclosure.
Figure 2:
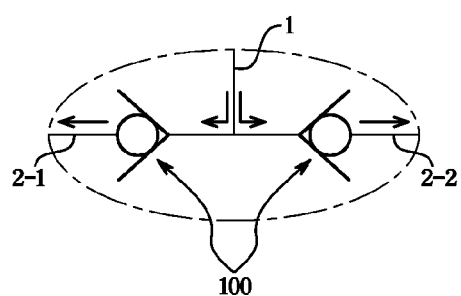
FIG. 2 is a diagram schematically illustrating a flow passage in which a check valve may be provided according to an embodiment of the present disclosure.
Figure 3:
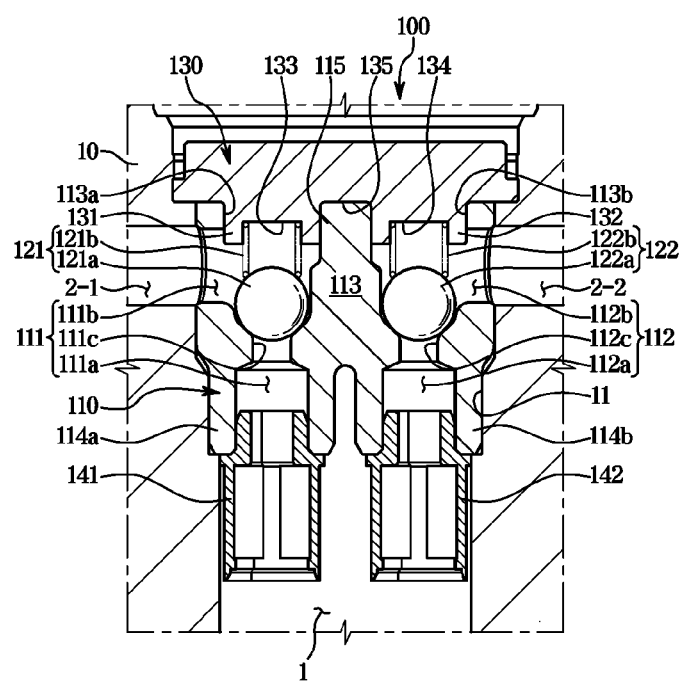
FIG. 3 is a cross-sectional view illustrating a state in which a check valve is installed in the modulator block according to an embodiment of the present disclosure.
Figure 4:
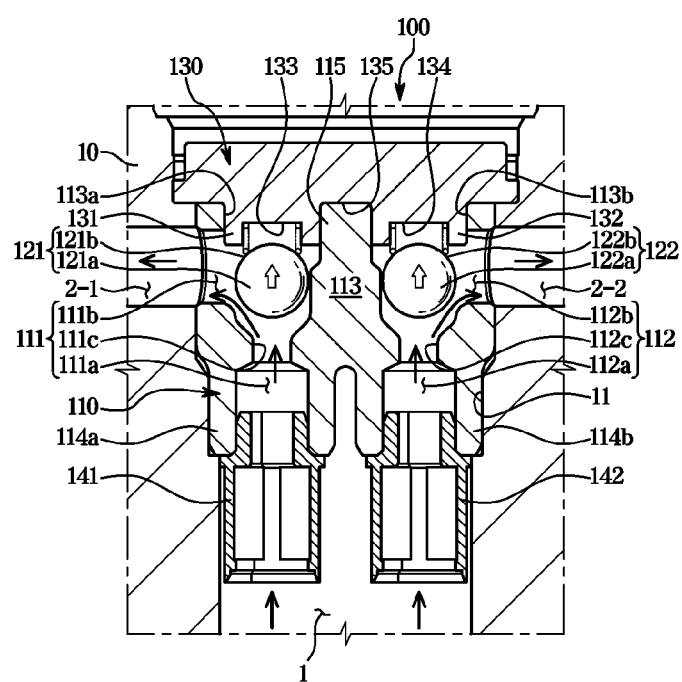
FIG. 4 is a cross-sectional view illustrating an operating state of a check valve according to an embodiment of the present disclosure.

FIG. 1 is a view illustrating as an example a modulator block of a brake system to which a check valve is applied according to an embodiment of the present disclosure, FIG. 2 is a diagram schematically illustrating a flow passage in which a check valve may be provided according to an embodiment of the present disclosure, FIG. 3 is a cross-sectional view illustrating a state in which a check valve is installed in the modulator block according to an embodiment of the present disclosure, and FIG. 4 is a cross-sectional view illustrating an operating state of a check valve according to an embodiment of the present disclosure.

Referring to FIGS. 1 to 4, the check valve 100 according to an aspect of the present disclosure may be installed in the modulator block 10 for the brake system.

Inside the modulator block 10, a plurality of flow passages are processed. As shown, the check valve 100 is installed in a coupling bore 11 communicating with a three-way flow passage having one suction flow passage 1 and two discharge flow passages 2-1 and 2-2 to control one-way flow of fluid.

More specifically, the check valve 100 includes a valve housing 110 in which a first internal flow passage 111 and a second internal flow passage 112 are provided, a first opening and closing member 121, a second opening and closing member 122, and a stopper member 130. The check valve 100 may be formed in an integral type assembled from the outside and be mounted in one coupling bore 11 formed in the modulator block 10.

The valve housing 110 includes a first internal flow passage 111 and a second internal flow passage 112 so as to allow the flow of fluid to two discharge passages s 2-1 and 2-2, respectively. The first and second internal flow passages 111 and 112 are spaced apart from each other and are formed to pass through an interior of the valve housing 110.

The first internal flow passage 111 may be provided with an inlet through which a fluid flows (hereinafter, referred to as a "first inlet 111a"), an outlet through which fluid is discharged (hereinafter, referred to as "first outlet 111b"), and a first orifice 111c communicating with the first inlet 111a and the first outlet 111b. Further, the second internal flow passage 112 may be provided with an inlet through which a fluid flows (hereinafter, referred to as a "second inlet 112a"), an outlet through which fluid is discharged (hereinafter, referred to as "second outlet 112b"), and a second orifice 112c communicating with the second inlet 112a and the second outlet 112b. That is, the fluid delivered through one suction passage 1 is provided to allow the fluid to flow toward the first and second outlets 111b and 112b through the first and second inlets 111a and 112a. A state in which the check valve 100 is operated according to a hydraulic pressure of the fluid will be described again below.

More specifically, the valve housing 110 includes a body 113 that is press-fitted to the coupling bore 11. In a state in which the valve housing 110 is pressed into the coupling bore 11, the first and second outlets 111b and 112b are formed on the side surfaces of the body 113 so that the two discharge passages 2-1 and 2-2 communicate with the first and second outlets 111b and 112b, respectively. Here, it should be understood that forming each outlet 111b and 112b on the side of the body 113, for example, may be formed by changing the position of each outlet 111b and 111b according to the position of each outlet passage 2-1 and 2-2 formed in the modulator block 10.

Further, a first opening 113a communicating with the first internal passage 111 and a second opening 113b communicating with the second internal passage 112 may be formed at the upper end of the body 113. The first and second openings 113a and 113b are formed to easily install first and second opening and closing members 121 and 122 to be described later, and the first and second openings 113a and 113b are closed by coupling with the stopper member 130. Further, the valve housing 110 may include a guide wall 115 that divides the first internal passage 111 and the second internal passage 112 between the first and second openings 113a and 113b and is press-fitted with the stopper member 130. The guide wall 115 serves to guide the balls 121a and 122a of the first and second opening and closing members 121 and 122 to stably move.

Further, at the lower end of the body 113, a first coupling portion 114a protruding downward to form a first inlet 111a and a second coupling portion 114b protruding downward to form a second inlet 112a may be provided.

Filter members 141 and 142 are installed at the first and second coupling portions 114a and 114b, respectively. That is, the first filter member 141 is installed in the first coupling portion 114a to filter foreign substances in the fluid flowing into the first inlet 111a, and the second filter member 142 is installed in the second coupling portion 114b to filter foreign substances in the fluid flowing into the second inlet 112a.

On assembling the check valve 100 from the outside, the first and second filter members 141 and 142 may be integrally assembled with each other and mounted in one coupling bore 11 formed in the modulator block 10.

The first opening and closing member 121 includes a first ball 121a that contacts the first orifice 111c and opens and closes the first orifice 111c by an operation by the hydraulic pressure of the fluid, and a first elastic member 121b in the form of a coil spring for elastically pressing the first ball 121a toward the first orifice 111c. The second opening and closing member 122 includes a second ball 122a that contacts the second orifice 112c and opens and closes the second orifice 112c by an operation by the hydraulic pressure of the fluid, and a second elastic member 122b in the form of a coil spring for elastically pressing the second ball 122a toward the second orifice 112c. That is, in response to the hydraulic pressure of the fluid flowing through the first and second inlets 111a and 112a being greater than the elastic force of the first and second elastic members 121b and 122b, the first orifice 111c and the second orifice 112c are opened as the first ball 121a and the second ball 122a move while compressing the first and second elastic members 121b and 122b, respectively. Accordingly, the first inlet 111a and the first outlet 111b communicate with each other, and the second inlet 112a and the second outlet 112b communicate with each other, so that the fluid is discharged through the two discharge passages 2-1 and 2-2, respectively.

The stopper member 130 is press-fitted to the coupling bore 11 of the modulator block 10 in a state of being press-fitted to the first opening 113a and the second opening 113b of the valve housing 110. More specifically, the stopper member 130 includes a first support 131 protruding downward so as to be press-fit into the first opening 113a and a second support 132 protruding downward so as to be press-fit into the second opening 113b.

The first support 131 is formed with a first support groove 133 recessed inwardly, and the second support part 132 is formed with a second support groove 134 recessed inwardly. The first and second support grooves 133 and 134 serve to stably support the first elastic member 121b and the second elastic member 122b, respectively.

Further, the first support 131 and the second support 132 may be provided to be partially exposed toward the first and second outlets 111b and 112b support portion in the state of being press-fitted to the first opening portion 113a and the second opening portion 113b, respectively. This is to limit the movement distance of each of the balls 121a and 122a in response to the first and second balls 121a and 122a being operated by the hydraulic pressure of the fluid.

Meanwhile, as the first support part 131 and the second support part 132 protrude downward, a concave-convex coupling groove 135 may be formed between the first support part 131 and the second support part 132. The coupling groove 135 has a shape corresponding to the guide wall 115 formed between the first opening 113a and the second opening 113b of the valve housing 10 and is press-fitted with the guide wall 115. Accordingly, portions of the stopper member 130 and the valve housing 110 facing each other are integrally press-fitted, thereby maintaining a tight coupling state as well as preventing fluid from leaking between the stopper member 130 and the valve housing 110.

Figure 5:
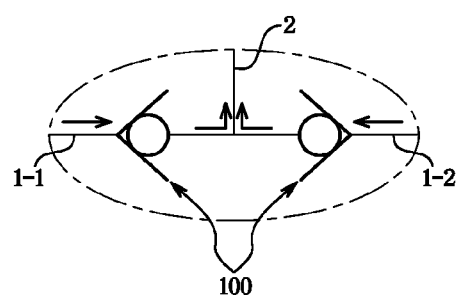
FIG. 5 is a diagram schematically illustrating a flow passage in which a check valve may be provided according to another embodiment of the present disclosure.
Figure 6:
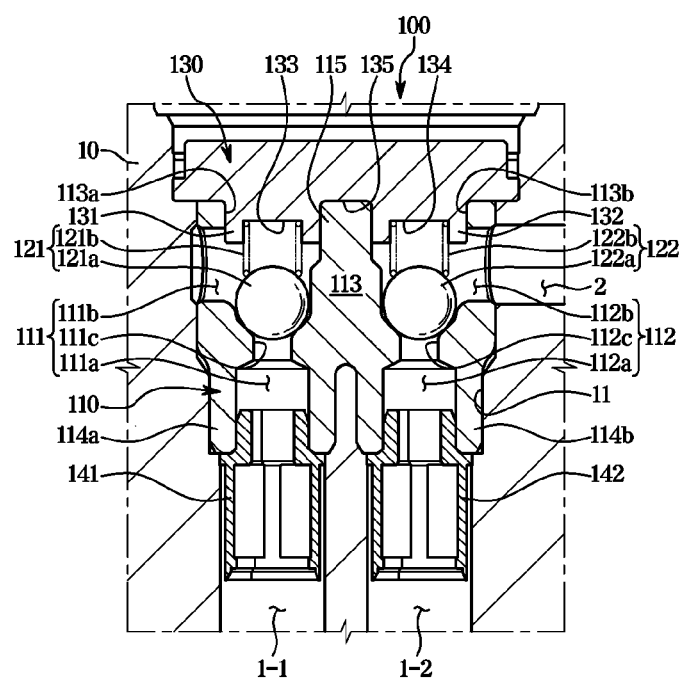
FIG. 6 is a cross-sectional view illustrating a state in which a check valve is installed in the modulator block according to another embodiment of the present disclosure.
Figure 7:
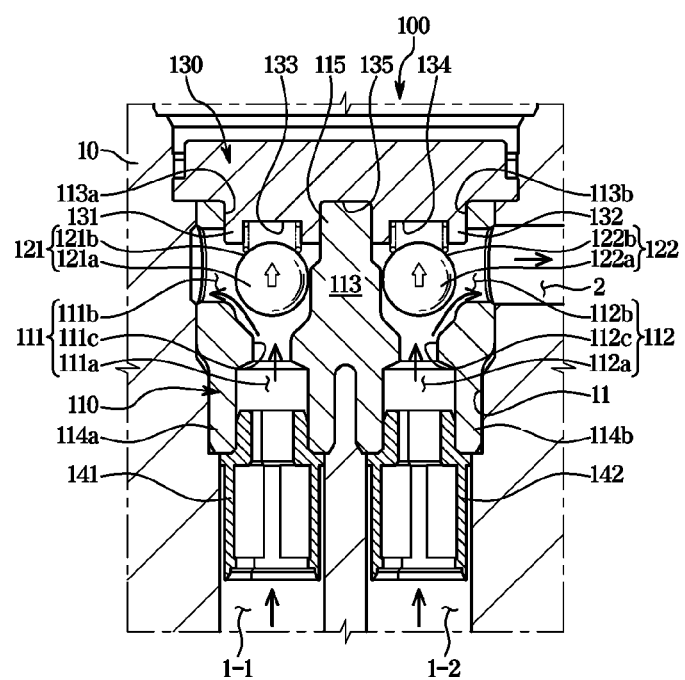
FIG. 7 is a cross-sectional view illustrating an operating state of a check valve according to another embodiment of the present disclosure.

FIG. 5 is a diagram schematically illustrating a flow passage in which a check valve may be provided according to another embodiment of the present disclosure, FIG. 6 is a cross-sectional view illustrating a state in which a check valve is installed in the modulator block according to another embodiment of the present disclosure, and FIG. 7 is a cross-sectional view illustrating an operating state of a check valve according to another embodiment of the present disclosure. A structure of the check valve according to this embodiment is the same as the structure of the check valve of the previous embodiment. Accordingly, a detailed description of the check valve will be omitted.

According to this embodiment, the modulator block 10 is provided with a three-way flow passage having two suction passages 1-1 and 1-2 and one discharge passage 2. A check valve 100 is installed in one coupling bore 11 communicating with the three-way flow passage to control the one-way flow of the fluid.

Referring to FIGS. 5 to 7, the check valve 100 press-fitted to the coupling bore 11 is configured to be respectively connected to the first inlet 111a of the two suction passages 1-1 and 1-2 and the first internal passage 111 and the second inlet 112a of the second internal flow passage 112. Accordingly, the first opening and closing member 121 provided in the first internal flow passage 111 and the second opening and closing member 122 provided in the second internal flow passage 112 operate independently according to the hydraulic pressure of the fluid flowing into each of the inlets 111a and 112a.

Further, in response to the first opening and closing member 121 and/or the second opening and closing member 122 being operated by the hydraulic pressure of the fluid to allow the flow of the fluid, the fluid is discharged into one discharge passage 2 through the first and second internal passages 111 and 112. That is, a flow passage groove may be formed in the coupling bore 11 so that one discharge passage 2 and each of the discharge ports 111b and 112b communicate with each other in the vicinity of the first and second discharge ports 111b and 112b. Accordingly, the fluid through the first internal flow channel 111 or the fluid through the second internal flow channel 112 is both discharged to one discharge channel 2.

As described above, even if anyone of a three-way flow passage having one suction passage 1 and two discharge passages 2-1 and 2-2, or a three-way flow passage having two suction passages 1-1 and 1-2 and one discharge passage 2 is formed in the modulator block 10, the check valve 10 according to an aspect of the present disclosure may control the flow of fluid without changing the structure. In addition, conventionally, since two check valves must be installed respectively, a flow passage has to be separately processed, as well as a bore for installing a check valve, but according to this embodiment, there is an effect that can reduce the assembly process and reduce the cost because only one coupling bore 11 for installation of the check valve 100 is processed by having two check valves integrated into one.

Meanwhile, in response to the check valve 100 being pressed into the coupling bore 11 of the modulator block 10, a portion to be pressed may be changed according to the formation structure of the three-way flow passage. For example, as shown in FIG. 3, in the case of a three-way flow passage having one suction passage 1 and two discharge passages 2-1 and 2-2, the body 113 of the valve housing 110 may be press-fit into the coupling bore 11. Accordingly, the body 113 performs a sealing function so that fluid does not leak between the body 113 and the coupling bore 11.

Further, as shown in FIG. 5, in the case of a three-way flow passage with two suction passages 1-1 and 1-2 and one discharge passage 2, the first and second coupling portions 114a and 114b of the valve housing 110 may be press-fit into the coupling bore 11. Accordingly, the first and second coupling portions 114a and 114b perform a sealing function to prevent fluid from leaking between the coupling bore 11 and the coupling bore 11.

As described above, the reason why the press-fit portion is divided according to the formation structure of the flow passage is because precise processing is required according to the press-fitting process, and thus, to minimize defects due to misassembly. However, in response to the check valve 100 according to the present disclosure is press-fit into the coupling bore 11, an outer appearance of the valve housing 110 may be press-fitted into the coupling bore 11 as a whole.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. A check valve comprising:
    a valve housing including first and second internal flow passages each formed to pass through an interior of the valve housing and having an inlet through which a fluid is introduced and an outlet through which the fluid is discharged;
    a first opening and closing member provided in the first internal flow passage and opened and closed by a hydraulic pressure of the fluid;
    a second opening and closing member provided in the second internal flow passage and opened and closed by the hydraulic pressure of the fluid; and
    a stopper member press-fitted to the valve housing,
    wherein
    the valve housing includes a body in which the outlet of the first internal flow passage and the outlet of the second internal flow passage are formed,
    on an upper end of the body, a first opening communicating with the first internal flow passage and a second opening communicating with the second internal flow passage are provided, and
    the stopper member is press-fitted to the first and second openings.

2. The check valve according to claim 1, wherein the stopper member includes:
    a first support press-fitted into the first opening and having a first support groove recessed inwardly, and
    a second support press-fitted into the second opening and having a second support groove recessed inwardly.

3. The check valve according to claim 2, wherein the first and second supports are provided to be press-fitted into the first and second openings and partially exposed toward the outlet of the first internal flow passage and the outlet of the second internal flow passage.

4. The check valve according to claim 1, further comprising: a filter member installed in the valve housing to filter foreign substances in the fluid flowing into each of the inlets.

5. The check valve according to claim 1, wherein the first opening and closing member includes:
    a first ball configured to open and close in contact with a first orifice provided in the first internal flow passage, and
    a first elastic member configured to elastically press the first ball toward the first orifice, and the second opening and closing member includes
- a second ball configured to open and close in contact with a second orifice provided in the second internal flow passage, and
- a second elastic member configured to elastically press the second ball toward the second orifice.

6. The check valve according to claim 1, wherein
the valve housing further includes first and second coupling portions on a lower end of the body, and
the first coupling portion protrudes downward so as to form the inlet of the first internal flow passage and the second coupling portion protrudes downward so as to form the inlet of the second internal flow passage.

7. The check valve according to claim 1, wherein
the valve housing includes a guide wall partitioned between the first and second internal flow passages and press-fitted with the stopper member.

8. A modulator block with a three-way flow passage with one suction passage and two discharge passages or two suction passages and one discharge passage, the modulator block comprising:
- one coupling bore communicating with the three-way flow passage,
wherein
the coupling bore includes a check valve that is press-fitted so as to control one-way flow of a fluid, the check valve comprising:
- a valve housing including first and second internal flow passages each formed to pass through an interior of the valve housing and having an inlet through which a fluid is introduced and an outlet through which the fluid is discharged;
- a first opening and closing member provided in the first internal flow passage and opened and closed by a hydraulic pressure of the fluid;
- a second opening and closing member provided in the second internal flow passage and opened and closed by the hydraulic pressure of the fluid; and
- a stopper member press-fitted to the valve housing,
the valve housing includes a body in which the outlet of the first internal flow passage and the outlet of the second internal flow passage are formed,
on an upper end of the body, a first opening communicating with the first internal flow passage and a second opening communicating with the second internal flow passage are provided, and
the stopper member is press-fitted to the first and second openings.

9. The modulator block according to claim 8, wherein
in response to the one suction passage being provided, the one suction passage is provided to be connected to each inlet of the first and second internal flow passages formed in the check valve, and the two discharge passages are provided to be respectively connected to each outlet of the first and second internal flow passages.

10. The modulator block according to claim 8, wherein
in response to the two suction passages being provided, the two suction passages are provided to be respectively connected to each inlet of the first and second internal flow passages formed in the check valve, and the one discharge passage is provided to be connected to each outlet of the first and second internal flow passages.

11. The modulator block according to claim 8, wherein
the stopper member is press-fitted to close the coupling bore.

12. The modulator block according to claim 8, further comprising: a filter member installed in the valve housing to filter foreign substances in the fluid flowing into each of the inlets.

13. The modulator block according to claim 8, wherein
the first opening and closing member includes:
- a first ball configured to open and close in contact with a first orifice provided in the first internal flow passage, and
- a first elastic member configured to elastically press the first ball toward the first orifice, and the second opening and closing member includes
- a second ball configured to open and close in contact with a second orifice provided in the second internal flow passage, and
- a second elastic member configured to elastically press the second ball toward the second orifice.

14. The modulator block according to claim 8, wherein
the valve housing further includes first and second coupling portions on a lower end of the body, and
the first coupling portion protrudes downward so as to form the inlet of the first internal flow passage and the second coupling portion protrudes downward so as to form the inlet of the second internal flow passage.

15. The modulator block according to claim 8, wherein
the stopper member includes:
- a first support press-fitted into the first opening and having a first support groove recessed inwardly, and
- a second support press-fitted into the second opening and having a second support groove recessed inwardly.

16. The modulator block according to claim 15, wherein
the first and second supports are provided to be press-fitted into the first and second openings and partially exposed toward the outlet of the first internal flow passage and the outlet of the second internal flow passage.

17. The modulator block according to claim 8, wherein
the valve housing includes a guide wall partitioned between the first and second internal flow passages and press-fitted with the stopper member.

* * * * *